United States Patent [19]

Christopher

[11] E Re. 31,420

[45] Reissued Oct. 18, 1983

[54] POWDERED METAL CASING FOR PERFORATING CHARGE AND ITS METHOD OF MANUFACTURE

[75] Inventor: Glenn B. Christopher, Fort Worth, Tex.

[73] Assignee: Jet Research Center, Inc., Arlington, Tex.

[21] Appl. No.: 410,748

[22] Filed: Aug. 23, 1982

Related U.S. Patent Documents

Reissue of:

[64] Patent No.: 4,220,687
Issued: Sep. 2, 1980
Appl. No.: 887,567
Filed: Mar. 17, 1978

[51] Int. Cl.[3] ..... B22F 3/00; E21B 43/26; E21B 43/111

[52] U.S. Cl. ..... 428/546; 175/4.6; 419/66

[58] Field of Search ..... 175/4.6; 102/20; 419/66; 428/546

[56] References Cited

U.S. PATENT DOCUMENTS

| | | | |
|---|---|---|---|
| 2,785,631 | 3/1957 | Blanchard | 175/4.6 |
| 2,980,017 | 4/1961 | Castel | 175/4.6 |
| 3,034,178 | 5/1962 | Cartier et al. | 75/214 |
| 3,079,863 | 3/1963 | Charrin | 102/20 |
| 3,121,389 | 2/1964 | Delacour | 102/20 |

*Primary Examiner*—Brooks H. Hunt
*Attorney, Agent, or Firm*—Joseph A. Walkowski; Thomas R. Weaver

[57] ABSTRACT

Disclosed herein is a powdered metal casing and an apparatus and method for making the powdered metal casing, which casing is useful for shaped explosive charges for perforating oil and gas wells.

4 Claims, 4 Drawing Figures

POWDERED METAL CASING FOR PERFORATING CHARGE AND ITS METHOD OF MANUFACTURE

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to a casing for shaped explosive charges for use in perforating oil and gas wells, and its method of manufacture.

The use of shaped charges for perforating in oil wells is well known. Such shaped charges include a bell shaped housing or casing into which is inserted a cone shaped liner with explosive material therebetween. The shaped charge is then located in the tubular housing of a perforating gun and oriented such that when the explosive is detonated the conical liner is destroyed and a jet is formed which is directed through a port in the housing of the gun to perform the desired perforating.

In a nonexpendable gun the port is sealed with a replaceable plug such that after perforation the gun assembly may be retrieved and new shaped charges and port plugs may be installed such that the gun assembly may be reused.

The explosions of the shaped charge to perform the perforating operations tends to cause swelling and distortion in the gun housing. Because of these distortions, the life of the gun housing may be shortened such that the gun housing must be discarded after a few uses.

Several attempts in the past have been made to reduce damage to the gun housing without affecting the performance of the shaped charge. One such attempt to increase the life of the gun housing is shown in U.S. Pat. No. 3,282,354 to Hakala et al wherein a double walled case was used around the shaped charge.

In the past, pressed metal liners have been used for insertion into a machined steel casing to form the shaped charge.

In the present invention a pressed powdered metal casing is disclosed for use with a shaped charge in an oil well perforating gun, which casing is destroyed with the detonation of the explosive material. It has been found that use of the pressed powder metal casing results in less distortion and damage to the perforator gun housing.

It has also been found that the pressed metal casing is reduced to a powder by the explosion of the shaped charge. This powder is easily removable from the perforator gun housing when the housing is being cleaned for reuse.

It has further been found that the use of the heavier metals in the pressed metal casing for the shaped charge results in deeper perforations than when a lighter metal, for instance iron, is used. It has also been found that when a lighter metal such as iron is used, less distortion of the perforator gun housing results.

Also disclosed is a molding apparatus and components of a powdered metal mix which may be used in forming the shaped charge [housing] *casing* of the invention.

THE DRAWINGS

A brief description of the appended drawings follows:

FIG. 1 provides a horizontally sectioned view of the perforator gun assembly with the shaped charge in place and sectioned.

Figure 1:
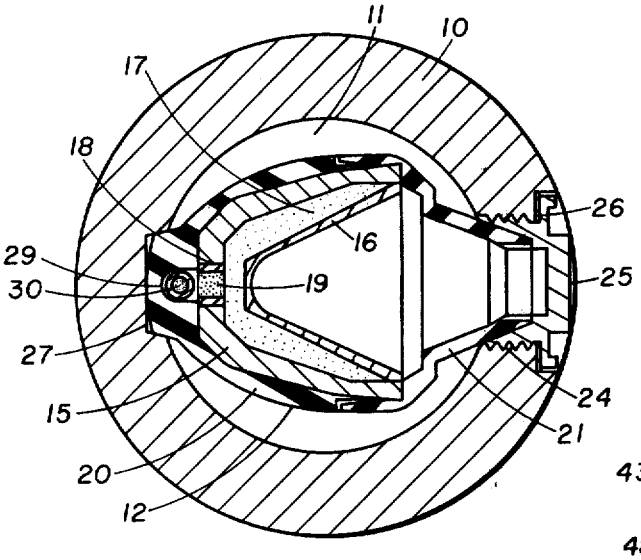

Shown in FIG. 1 is a cross-section of a reusable perforating gun including a hollow carrier 10 which is a tube or a pipe having an interior bore 11 therethrough. Located in the interior bore 11 is a shaped charge apparatus 12. As is known in the art, the shaped charge apparatus 12 may be one of a plurality of charges spaced within the hollow carrier 10 in a desired orientation and distribution.

The shaped charge assembly 12 includes a powdered metal [housing] *casing* 15, a charge liner 16 forming a cone extending into the [housing] *casing* 15 as is known in the art, and explosive material 17 disposed between the charge liner 16 and the [housing] *casing* 15.

A hole 18 is provided through the rear of the [housing] *casing* 15 immediately opposite the apex of the cone of the charge liner 16 and has located therein a booster 19 for detonating the explosive material 17. The shaped charge assembly 12 is covered with a rubber covering having a rear portion 20 and a forward portion 21 cemented over the [housing] *casing* 15 as is shown in FIG. 1. The forward portion 21 of the rubber covering provides the desired stand off for forming a jet of hot gases from the detonation of explosive 17.

A port 24 is provided through the hollow carrier 10 and is sealed by an appropriate plug means such as the threaded port plug 25. A sealing washer 26 is located between the port plug 25 and the hollow carrier 10 and is compressed by the threaded connection between the port plug 25 and port 24 such that a fluid tight seal is established between the exterior of the hollow carrier 10 and the interior bore 11 of the carrier.

Means are additionally provided in the charge carrier 10 to locate the shaped charge assembly 12 in the desired orientation such that the jet of hot gases is directed through the port plug for perforation of the oil well as desired. This centering means is shown in FIG. 1 as recess 27 into which a corresponding projection of the rear rubber covering 20 extends in order that the shaped charge is held in the desired orientation.

A hole 29 passes through the rear rubber covering portion 20 at right angles to the axis of rotation of the charge liner 16 and the [housing] *casing* 15, and is adjacent to the booster charge 19. Primacord 30 is passed through the hole 29 and likewise passes through other shaped charge assemblies in the hollow carrier 10. The primacord 30 is initiated by a suitable detonating device such that when the primacord is detonated the booster charge 19 is in turn detonated for igniting the explosive charge 17 to form the desired jet of the perforator.

The hollow carrier 10 is dimensioned such and is of sufficient strength that the hollow carrier 10 may be used repeatedly for several perforating operations.

Figure 2:
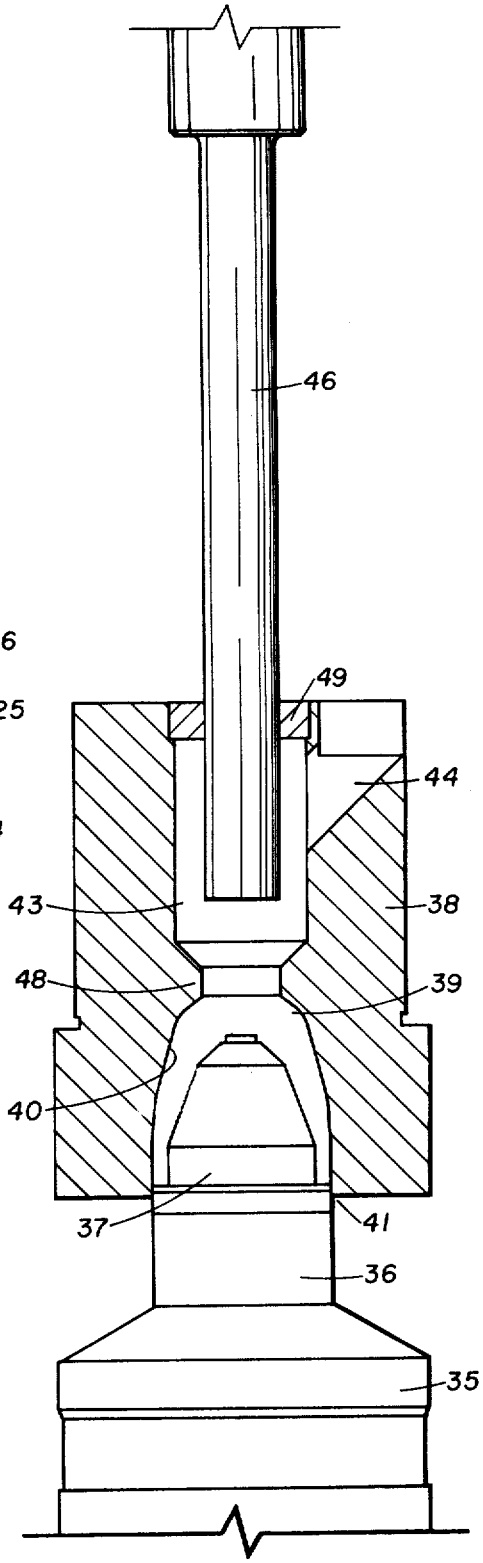
FIG. 2 shows an apparatus for compressing the shaped charge [housing] *casing* with the apparatus in the loading position.

Shown in FIG. 2 is an apparatus which may be used in pressing the powdered metal [housing] *casing* 15. The apparatus in FIG. 2 is shown in the loaded position, and includes an anvil 35 having a pedestal 36 upon which is mounted an interior mold 37 having the shape of the interior walls of the finished [housing] *casing* 15. Arranged over the interior mold 37 is a mold housing 38 having an interior mold chamber 39 surrounding the interior mold 37. The interior walls 40 of the mold chamber 39 have the shape of the outer walls of the [housing] *casing* 15. The pedestal 36 of the anvil 35 is fitted into the molding chamber 39 of the mold housing 38, and slidable movement is allowed at 41 between the pedestal 36 and the housing 38 without passing a powdered metal mix in the molding chamber 39.

In the upper portion of mold housing 38 is a loading chamber 43. A loading port 44 is provided through the mold housing 38 and into loading chamber 43 for the entry of powdered metal mix into the loading chamber 43.

A plunger 46 is centered in the loading chamber 43 and is arranged such that when the plunger 46 is lowered into the necked down portion 48 of the housing 38, a tight engagement between the portion 48 and the plunger 46 is established such that powdered mix may not pass between chambers 43 and 39 when the plunger 46 is in its lower position in the necked down portion 48.

A centering and sealing means 49 is provided in the upper end of mold housing 38 around plunger 46 to center plunger 46 in the desired location in chamber 43 and to prevent passage of mix between the plunger 46 and the housing 38.

It will be seen that when powdered mix is injected into loading port 44, the mix flows into loading chamber 43 and through the necked down portion 48 into the mold chamber 40 when the plunger is in the position shown in FIG. 2.

Figure 3:
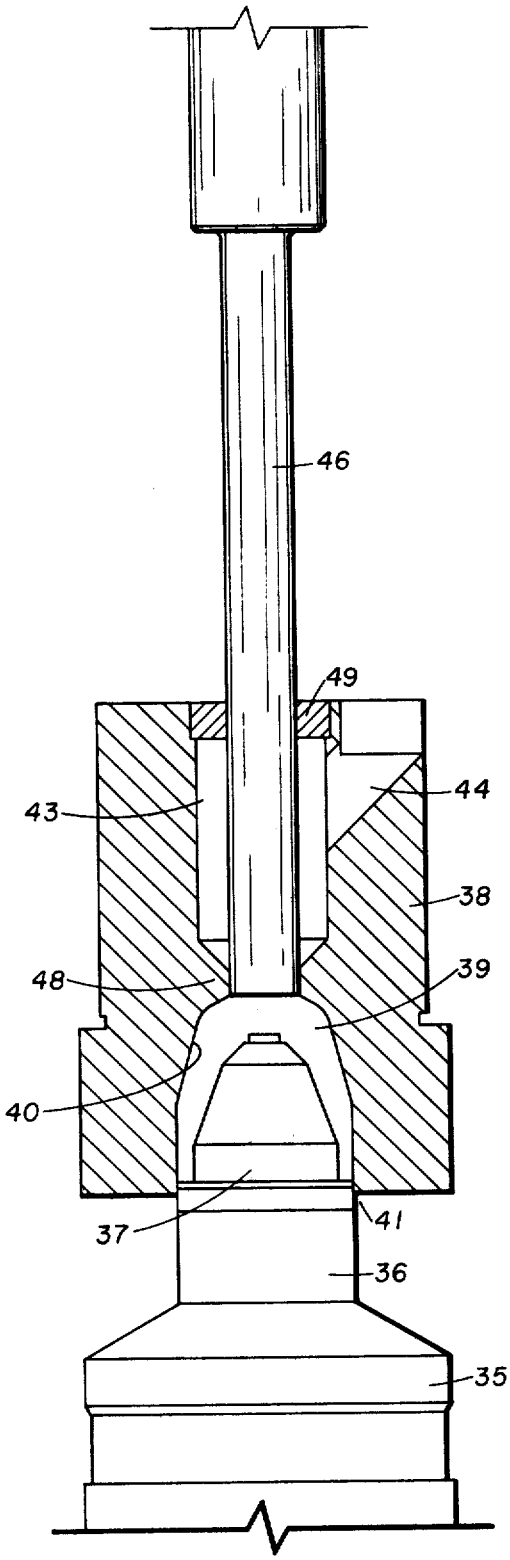
FIG. 3 shows the apparatus of FIG. 2 in the loaded position before the compression step.

FIG. 3 shows the molding apparatus in the cut off or loaded position just prior to compression of the powdered metal mix in the molding chamber 39. The plunger 46 has been moved to a lower position wherein the bottom end of plunger 46 is in the necked down portion 48 of the mold housing 38 to cut off the flow of powdered metal mix between the chambers 43 and 39. It will be understood that in that position, the plunger 46 forms one end of the mold chamber 39 for forming the rear end of the casing 15.

Figure 4:
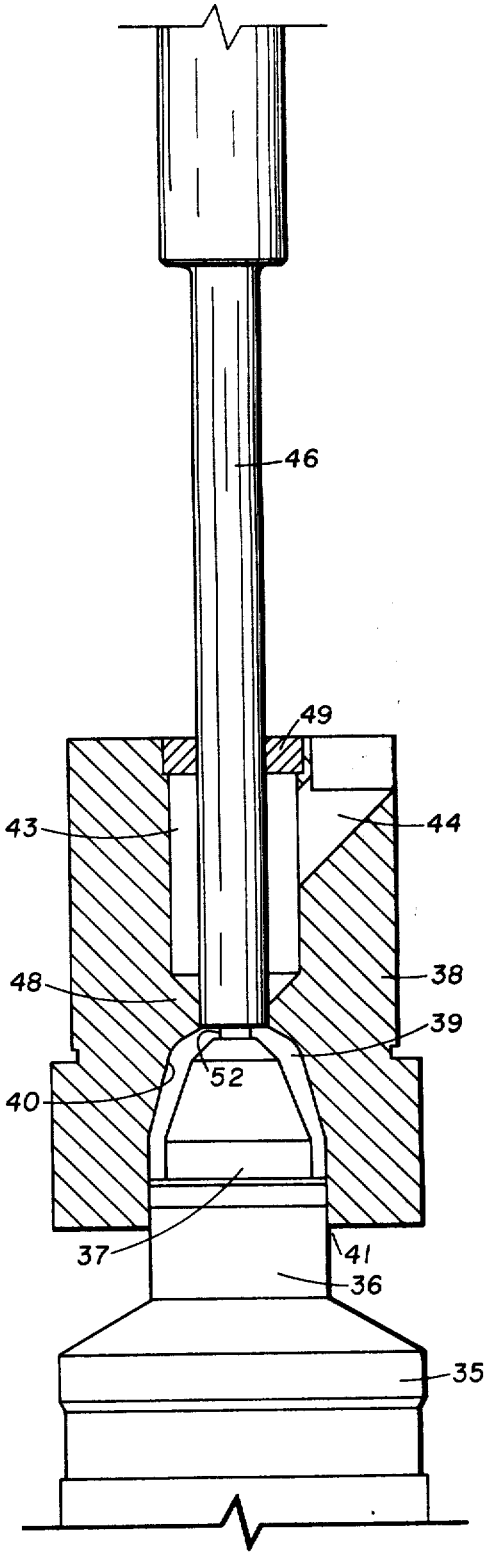
FIG. 4 shows the apparatus of FIGS. 2 and 3 in the fully compressed position wherein the pressed metal casing of the shaped charge is formed.

The molding apparatus is shown in FIG. 4 in the compressed position wherein the [housing] *casing* 15 is fully compressed to its desired shape. To arrive at this position, the plunger 46 and the mold housing 38 are both moved downwardly together and the powdered metal mix in molding chamber 39 is compressed until an approximate load of 120,000 pounds per square inch is exerted on the powder.

A projection may be provided at 52 on the end of plunger 46 to cut the hole 18 in the rear of the powdered metal casing 15 or hole 18 may be punched or drilled into the rear of the casing 15 by a separate operation as desired.

After the compressing operation is complete, the mold housing 38 and the plunger 46 are raised, and the now compressed casing, by virtue of the friction between walls 40 and the compressed casing, remains in molding chamber 39 and is raised with the housing 38. The finished casing is then ejected from the molding chamber 39 by lowering the plunger 46 to punch out the casing into an appropriate receiving means.

The molding apparatus is then returned to the loading position shown in FIG. 2 for a repeat of the operation to form another compressed powdered metal casing.

The powdered metal mix is composed of about 80 percent by weight of a powdered metal having a diameter of approximately 100 microns, 19 percent by weight of lead powder having a diameter of approximately 100 microns, and one percent by weight of graphite powder. The powdered components of the mix are available from Glidden Metals at 900 Union Commerce Building, Cleveland, Ohio 44115. The lead powder is identified as Glidden 100-B and the graphite powder is identified as Glidden No. 1645. Iron powder identified as Glidden B-214 may be used in the mix, or copper powder identified as Glidden 100 RXM may be used as desired.

It has been found that a pressed powder casing of a metal with a higher atomic number used with the same amount of explosive material results in deeper penetration of a beria target in a standard test. The following table shows the resulting penetrations into a beria target of a machined steel casing, pressed iron casing and a pressed copper casing, each used in a 3⅛" outside diameter gun.

| Machined Steel | | Pressed Iron | | Pressed Copper | |
|---|---|---|---|---|---|
| Shot 1 | 9.14" | Shot 1 | 7.60" | Shot 1 | 10.04" |
| Shot 2 | 10.81" | Shot 2 | 8.30" | Shot 2 | 8.26" |
| Shot 3 | 7.62" | Shot 3 | 6.95" | Shot 3 | 8.10" |
| Avg. | 9.19" | Avg. | 7.62" | Avg. | 8.80" |

It can be seen that the penetration of a gun using a pressed copper casing is generally superior to that of pressed iron, and is about the same as a conventional machined steel casing.

It has been found that a pressed powder casing of a metal with a lower atomic number used with the same amount of explosive material results in less carrier expansion. The following table gives a comparison of the resulting carrier expansions for machined steel, pressed iron, and pressed copper casings, each used with a 3⅛" outside diameter gun.

| Machined Steel | | Pressed Iron | | Pressed Copper | |
|---|---|---|---|---|---|
| Shot 1 | .012" | Shot 1 | .010" | Shot 1 | .007" |
| Shot 2 | .016" | Shot 2 | .015" | Shot 2 | .026" |
| Shot 3 | .024" | Shot 3 | .016" | Shot 3 | .020" |
| Avg. | .017" | Avg. | .014" | Avg. | .018" |

It can thus be seen that the carrier expansion of a gun using a pressed iron casing is generally less than that of a pressed copper or a machined steel casing. It can also be seen that the carrier expansion for a gun using pressed copper casings is about the same as one having machined steel casings.

The pressed metal casing of the shaped charge of the invention is one which is inexpensive to fabricate and which provides a precision casing. When the shaped charge is detonated, the casing absorbs some of the energy of the exploding charge for reducing the casing to a powder. The powder residue resulting from the destruction of the powdered metal casing is more easily cleaned from the hollow carrier in preparing the carrier for later perforation operations. The case is compressed sufficiently to provide a green compact and is not sintered, thus the precision of the casing is maintained since there is no shrinkage or distortion caused by a heating or sintering process.

By using shaped charges having pressed powder metal casings using a metal having a lower atomic number such as iron, less distortion is imparted to the hollow carrier giving the carrier longer life.

By using shaped charges having pressed powder metal casing using a metal having a higher atomic number such as copper, the penetration of the shaped charge is increased to be about the same as the penetration of a machined steel casing, while retaining the advantages of simpleness of fabrication and low cost in making a precision casing.

The foregoing embodiments, such as the constituents, composition, and sizes of the powdered mix, have been disclosed as illustrative embodiments of the invention. Changes and modifications of these embodiments will be apparent to those skilled in the art. The appended claims are intended to cover such equivalent embodiments which may fall within the true spirit and scope of the invention.

What is claimed is:

1. A shaped charge casing formed solely of a green compact consisting of powdered metal sufficiently compressed to [form a jet] *confine energy released* upon explosion of said shaped charge while being reduced to a powder by said explosion.

2. The casing of claim 1 wherein said powdered metal is compressed to approximately 120,000 PSI.

3. The casing of claim 1 wherein said compact is composed of about 80 percent by weight of a powdered metal having a diameter of approximately 100 microns, about 19 percent by weight of powdered lead having a diameter of approximately 100 microns, and about one percent by weight of graphite powder.

4. The casing of claim 3 wherein said powdered metal has an atomic number at least as great as iron.

* * * * *